US012631408B2

(12) United States Patent
Yuan et al.

(10) Patent No.: US 12,631,408 B2
(45) Date of Patent: May 19, 2026

(54) CONNECTING PIPE ASSEMBLY AND HEAT EXCHANGER

(71) Applicant: Danfoss A/S, Nordborg (DK)

(72) Inventors: Jing Yuan, Haiyan (CN); Jing Yang, Haiyan (CN); Yubao Liu, Haiyan (CN); Lisha Chen, Haiyan (CN)

(73) Assignee: DANFOSS A/S, Nordborg (DK)

( * ) Notice: Subject to any disclaimer, the term of this patent is extended or adjusted under 35 U.S.C. 154(b) by 423 days.

(21) Appl. No.: 18/303,027

(22) Filed: Apr. 19, 2023

(65) Prior Publication Data

US 2023/0341196 A1      Oct. 26, 2023

(30) Foreign Application Priority Data

Apr. 20, 2022      (CN) .......................... 202220934226.9

(51) Int. Cl.
*F28F 9/04*          (2006.01)
*F16L 41/12*          (2006.01)

(52) U.S. Cl.
CPC ................ *F28F 9/04* (2013.01); *F16L 41/12* (2013.01)

(58) Field of Classification Search
CPC ........ F28F 9/04; F28F 9/12; F28F 9/06; F16L 41/12
USPC ......................................................... 165/173
See application file for complete search history.

(56) References Cited

U.S. PATENT DOCUMENTS

| | | | | | |
|---|---|---|---|---|---|
| 5,348,082 | A | * | 9/1994 | Velluet | F28F 9/165 |
| | | | | | 165/178 |
| 5,477,919 | A | * | 12/1995 | Karube | F28F 9/0212 |
| | | | | | 165/178 |
| 5,911,274 | A | * | 6/1999 | Inaba | F28F 9/0251 |
| | | | | | 285/201 |
| 5,937,939 | A | * | 8/1999 | Inaba | F28F 9/002 |
| | | | | | 165/173 |
| 5,950,713 | A | * | 9/1999 | Kato | F28F 9/002 |
| | | | | | 228/183 |
| 6,293,011 | B1 | * | 9/2001 | Hasegawa | F28D 1/05366 |
| | | | | | 285/125.1 |
| 6,347,663 | B1 | * | 2/2002 | Hunzinger | F28F 9/0251 |
| | | | | | 228/136 |
| 6,443,502 | B1 | * | 9/2002 | Iida | F25B 41/40 |
| | | | | | 285/918 |
| 6,543,530 | B2 | * | 4/2003 | Watanabe | F28F 9/0253 |
| | | | | | 165/178 |
| 6,776,225 | B2 | * | 8/2004 | Leitch | F28D 1/0325 |
| | | | | | 165/173 |
| 7,219,717 | B2 | * | 5/2007 | Hanafusa | F25B 39/022 |
| | | | | | 165/174 |
| 7,237,807 | B2 | * | 7/2007 | Hiyama | F28F 9/0256 |
| | | | | | 285/201 |

(Continued)

OTHER PUBLICATIONS

Extended European Search Report corresponding to European Patent Application No. 23167287.4 dated Aug. 17, 2023.

*Primary Examiner* — Claire E Rojohn, III

(74) *Attorney, Agent, or Firm* — McCormick, Paulding & Huber PLLC

(57)          ABSTRACT

A connecting pipe assembly and a heat exchanger is disclosed. The connecting pipe assembly includes: a pipe; and a first flange extending towards a radial outside from an outer peripheral surface of the pipe. The pipe includes a first insertion pipe section located on one side of the first flange in an axial direction of the pipe. Thereby the quality of the heat exchanger is improved.

8 Claims, 11 Drawing Sheets

(56) References Cited

U.S. PATENT DOCUMENTS

| | | | | |
|---|---|---|---|---|
| 7,926,854 | B2 * | 4/2011 | Sharma | F28F 9/0253 165/178 |
| 8,091,617 | B2 * | 1/2012 | Kirschenmann | F28F 9/0246 165/174 |
| 9,982,952 | B2 * | 5/2018 | Lavenu | F28F 9/0248 |
| 2011/0272130 | A1 * | 11/2011 | Yamazaki | F28F 9/0251 165/185 |
| 2021/0381781 | A1 * | 12/2021 | Shin | F28F 9/0204 |
| 2023/0341196 | A1 * | 10/2023 | Yuan | F28F 9/0246 |

* cited by examiner

CONNECTING PIPE ASSEMBLY AND HEAT EXCHANGER

CROSS-REFERENCE TO RELATED APPLICATION

This application claims foreign priority benefits under 35 U.S.C. § 119 from Chinese Patent Application No. 202220934226.9, filed Apr. 20, 2022, the content of which is hereby incorporated by reference in its entirety.

TECHNICAL FIELD

Embodiments of the present disclosure relate to a connecting pipe assembly and a heat exchanger.

BACKGROUND

The heat exchanger includes a manifold and a collection manifold or storage tank, etc. connected to the manifold. The manifold is connected and fluidly communicated with the collection manifold or storage tank, etc. through a connection pipe.

SUMMARY

It is an object of embodiments of the present disclosure to provide a connecting pipe assembly and a heat exchanger, thereby, for example, improving the quality of the heat exchanger.

Embodiments of the present disclosure provide a connecting pipe assembly, including: a pipe; and a first flange extending towards a radial outside from an outer peripheral surface of the pipe, wherein the pipe includes a first insertion pipe section located on one side of the first flange in an axial direction of the pipe.

According to embodiments of the present disclosure, the pipe further includes a connecting pipe section located on the other side of the first flange in the axial direction of the pipe.

According to embodiments of the present disclosure, the first insertion pipe section is configured to be inserted in a first opening formed in a first tube wall of a first tubular member which is to be connected with the connecting pipe assembly, and the first flange is configured such that a first surface of the first flange on the one side of the first flange is connected with a first outer peripheral surface of the first tube wall of the first tubular member.

According to embodiments of the present disclosure, the first flange is further configured such that the first surface of the first flange has a same shape as a corresponding portion of the first outer peripheral surface of the first tube wall of the first tubular member surrounding the first opening.

According to embodiments of the present disclosure, the first surface of the first flange has a shape of a part of a cylindrical surface.

According to embodiments of the present disclosure, the pipe has a uniform inner diameter throughout a whole length of the pipe.

According to embodiments of the present disclosure, the first flange includes a first flange portion extending towards a radial outside from an end of the first insertion pipe section of the pipe and a second flange portion extending towards a radial outside from an end of the connecting pipe section of the pipe, an end face of the end of the first insertion pipe section of the pipe and an end face of the end of the connecting pipe section of the pipe abut against each other in the axial direction of the pipe, surfaces, facing each other, of the first flange portion and the second flange portion of the first flange abut against each other in the axial direction of the pipe, and the first insertion pipe section and the connecting pipe section of the pipe and the first flange portion and the second flange portion of the first flange are formed of a single pipe.

According to embodiments of the present disclosure, the connecting pipe assembly further includes: a second flange extending towards the radial outside from the outer peripheral surface of the pipe on the other side of the first flange in the axial direction of the pipe, wherein the pipe further includes a second insertion pipe section located on one side of the second flange away from the first flange in the axial direction of the pipe.

According to embodiments of the present disclosure, the second insertion pipe section is configured to be inserted in a second opening in a second tube wall of a second tubular member which is to be connected with the connecting pipe assembly, and the second flange is configured such that a second surface of the second flange on the one side of the second flange is connected with a second outer peripheral surface of the second tube wall of the second tubular member so that the first tubular member is in fluid communication with the second tubular member through the pipe.

According to embodiments of the present disclosure, the second flange is further configured such that the second surface of the second flange has a same shape as a corresponding portion of the second outer peripheral surface of the second tube wall of the second tubular member surrounding the second opening.

According to embodiments of the present disclosure, the second surface of the second flange has a shape of a part of a cylindrical surface.

According to embodiments of the present disclosure, the pipe further includes a connecting pipe section located between the first flange and the second flange, the first flange includes a first flange portion extending towards a radial outside from an end of the first insertion pipe section of the pipe and a second flange portion extending towards a radial outside from a first end of the connecting pipe section of the pipe, an end face of the end of the first insertion pipe section of the pipe and an end face of the first end of the connecting pipe section of the pipe abut against each other in the axial direction of the pipe, and surfaces, facing each other, of the first flange portion and the second flange portion of the first flange abut against each other in the axial direction of the pipe, the second flange includes a first flange portion extending towards a radial outside from an end of the second insertion pipe section of the pipe and a second flange portion extending towards a radial outside from a second end of the connecting pipe section of the pipe, an end face of the end of the second insertion pipe section of the pipe and an end face of the second end of the connecting pipe section of the pipe abut against each other in the axial direction of the pipe, and surfaces, facing each other, of the first flange portion and the second flange portion of the second flange abut against each other in the axial direction of the pipe, and the first insertion pipe section, the connecting pipe section and the second insertion pipe section of the pipe, the first flange portion and the second flange portion of the first flange and the first flange portion and the second flange portion of the second flange are formed of a single pipe.

Embodiments of the present disclosure further provide a heat exchanger, including: the above connecting pipe assembly.

Embodiments of the present disclosure further provide a heat exchanger, including: a first tubular member extending in a first direction, wherein the first tubular member has a first opening passing through a first tube wall of the first tubular member; and a connecting pipe assembly including: a pipe; and a first flange extending towards a radial outside from an outer peripheral surface of the pipe, wherein: the pipe includes a first insertion pipe section on one side of the first flange in an axial direction of the pipe, and the first insertion pipe section is inserted in the first opening formed in the first tube wall of the first tubular member, and a first surface of the first flange facing the first tubular member is connected with a first outer peripheral surface of the first tube wall of the first tubular member.

According to embodiments of the present disclosure, the first surface of the first flange has a same shape as a corresponding portion of the first outer peripheral surface of the first tube wall of the first tubular member surrounding the first opening.

According to embodiments of the present disclosure, an angle between an axis of the pipe of the connecting pipe assembly and an axis of the first tubular member is in a range of 85° to 90°.

According to embodiments of the present disclosure, a first end face of the first insertion pipe section is aligned with a corresponding portion of a first inner peripheral surface of the first tube wall of the first tubular member surrounding the first opening, in an axial direction of the first tubular member; or at least a portion of the first end face of the first insertion pipe section exceeds the corresponding portion of the first inner peripheral surface of the first tube wall of the first tubular member surrounding the first opening, in a radial direction of the first tubular member, and at least the portion of the first end face of the first insertion pipe section has a concave shape corresponding to the corresponding portion of the first inner peripheral surface of the first tube wall of the first tubular member, as viewed in the axial direction of the first tubular member; or in the radial direction of the first tubular member, the first end face of the first insertion pipe section is between a portion of the first outer peripheral surface of the first tube wall of the first tubular member surrounding the first opening and the portion of the first inner peripheral surface of the first tube wall of the first tubular member surrounding the first opening.

According to embodiments of the present disclosure, the heat exchanger further includes: a second tubular member disposed side by side with the first tubular member, wherein the second tubular member has a second opening passing through a second tubular wall of the second tubular member, wherein: the connecting pipe assembly further includes: a second flange extending towards the radial outside from the outer peripheral surface of the pipe on the other side of the first flange in the axial direction of the pipe, the pipe further includes a second insertion pipe section on one side of the second flange away from the first flange in the axial direction of the pipe, and the second insertion pipe section is inserted in the second opening formed in the second tube wall of the second tubular member, and a second surface of the second flange facing the second tubular member is connected with a second outer peripheral surface of the second tube wall of the second tubular member, so that the first tubular member is in fluid communication with the second tubular member through the pipe of the connecting pipe assembly.

According to embodiments of the present disclosure, the first surface of the first flange has a same shape as a corresponding portion of the first outer peripheral surface of the first tube wall of the first tubular member surrounding the first opening; and/or the second surface of the second flange has a same shape as a corresponding portion of the second outer peripheral surface of the second tube wall of the second tubular member surrounding the second opening.

According to embodiments of the present disclosure, an angle between an axis of the pipe of the connecting pipe assembly and an axis of the first tubular member is in a range of 85° to 90°; and/or an angle between the axis of the pipe of the connecting pipe assembly and an axis of the second tubular member is in a range of 85° to 90°.

According to embodiments of the present disclosure, a first end face of the first insertion pipe section is aligned with a corresponding portion of a first inner peripheral surface of the first tube wall of the first tubular member surrounding the first opening, in an axial direction of the first tubular member; or at least a portion of the first end face of the first insertion pipe section exceeds the corresponding portion of the first inner peripheral surface of the first tube wall of the first tubular member surrounding the first opening, in a radial direction of the first tubular member, and at least the portion of the first end face of the first insertion pipe section has a concave shape corresponding to the corresponding portion of the first inner peripheral surface of the first tube wall of the first tubular member, as viewed in the axial direction of the first tubular member; or in the radial direction of the first tubular member, the first end face of the first insertion pipe section is between a portion of the first outer peripheral surface of the first tube wall of the first tubular member surrounding the first opening and the portion of the first inner peripheral surface of the first tube wall of the first tubular member surrounding the first opening; and/or a second end face of the second insertion pipe section is aligned with a corresponding portion of a second inner peripheral surface of the second tube wall of the second tubular member surrounding the second opening, in an axial direction of the second tubular member; or at least a portion of the second end face of the second insertion pipe section exceeds the corresponding portion of the second inner peripheral surface of the second tube wall of the second tubular member surrounding the second opening, in a radial direction of the second tubular member, and at least the portion of the second end face of the second insertion pipe section has a concave shape corresponding to the corresponding portion of the second inner peripheral surface of the second tube wall of the second tubular member, as viewed in the axial direction of the second tubular member; or in the radial direction of the second tubular member, the second end face of the second insertion pipe section is between a portion of the second outer peripheral surface of the second tube wall of the second tubular member surrounding the second opening and the portion of the second inner peripheral surface of the second tube wall of the second tubular member surrounding the second opening.

According to embodiments of the present disclosure, the first tubular member is a manifold, and the heat exchanger further includes: a plurality of heat exchange tubes connected and fluidly communicated with the manifold, and a plurality of fins arranged alternately with the plurality of heat exchange tubes.

According to embodiments of the present disclosure, the first outer peripheral surface of the first tube wall of the first tubular member is a cylindrical surface, and the first surface of the first flange has a shape of a part of a cylindrical surface.

According to embodiments of the present disclosure, assuming that the first flange of the connecting pipe assembly has a circular ring shape as viewed in the axial direction of the pipe of the connecting pipe assembly, a width $L_f$ of an annular overlapping band between the first flange of the connecting pipe assembly and the first pipe wall of the first tubular member satisfies the following relation:

$$1.7 * \frac{R_P^2}{R_M^2} * t \leq L_f \leq 10.3 * \frac{R_P^2}{R_M^2} * t$$

where:

$R_p$ is a radius of the outer peripheral surface of the pipe of the connecting pipe assembly;

$R_M$ is a radius of the first outer peripheral surface of the first tube wall of the first tubular member; and t is a wall thickness of the pipe of the connecting pipe assembly.

With the connecting pipe assembly and the heat exchanger according to the embodiments of the present disclosure, for example, the quality of the heat exchanger can be improved.

DETAILED DESCRIPTION

Figure 1:
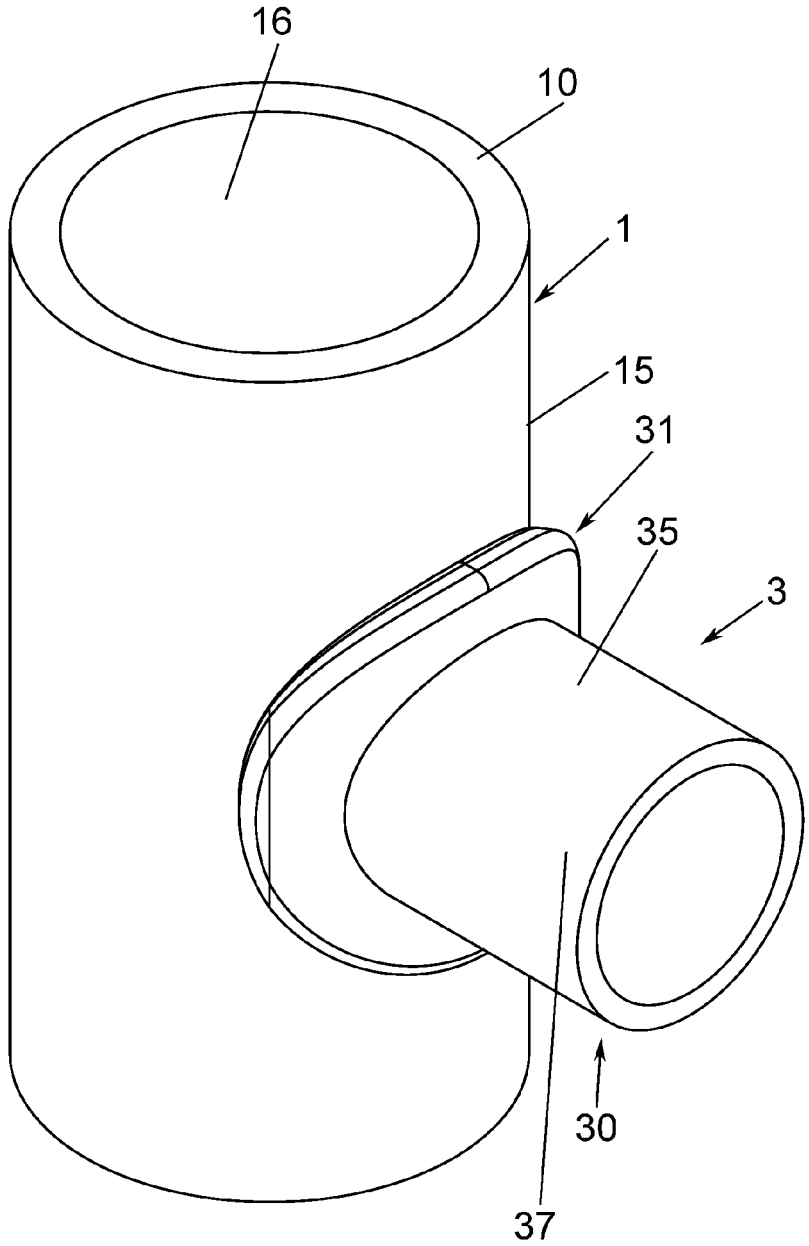
FIG. 1 is a schematic perspective view of a connecting pipe assembly connected to a first tubular member according to an embodiment of the present disclosure.

The present disclosure will be further described in detail below through embodiments in conjunction with accompanying drawings.

Referring to FIG. 1 to FIG. 11, a connecting pipe assembly 3 according to embodiments of the present disclosure includes: a pipe 30; and a first flange 31 extending towards a radial outside from an outer peripheral surface 35 of the pipe 30. The pipe 30 includes a first insertion pipe section 301 located on one side of the first flange 31 in an axial direction of the pipe 30.

Referring to FIG. 1 to FIG. 6, FIG. 9 and FIG. 11, in embodiments of the present disclosure, the pipe 30 further includes a connecting pipe section 37 located on the other side of the first flange 31 in the axial direction of the pipe 30. For example, referring to FIG. 9, the connecting pipe section 37 may be used to connect the heat exchanger with other components of an air conditioning system.

Referring to FIG. 1 to FIG. 8, in embodiments of the present disclosure, the first insertion pipe section 301 is configured to be inserted in a first opening 12 (see FIG. 2, FIG. 5 and FIG. 8) formed in a first tube wall 10 of a first tubular member 1 which is to be connected with the connecting pipe assembly 3, and the first flange 31 is configured such that a first surface 310 (see FIG. 2, FIG. 3, FIG. 5, FIG. 6 and FIG. 8) of the first flange 31 on the one side of the first flange 31 is connected with a first outer peripheral surface 15 of the first tube wall 10 of the first tubular member 1. An outer peripheral surface of the first insertion pipe section 301 may have a same shape as an inner peripheral surface of the first opening 12. The first flange 301 may be further configured such that the first surface 310 of the first flange 31 has a same shape as a corresponding portion of the first outer peripheral surface 15 of the first tube wall 10 of the first tubular member 1 surrounding the first opening 12. For example, the first outer peripheral surface 15 of the first tube wall 10 of the first tubular member 1 is a cylindrical surface, and the first surface 310 of the first flange 31 has a shape of a part of a cylindrical surface. An angle between an axis of the pipe 30 and an axis of the first tubular member 1 is in the range of 85° to 90°. The pipe 30 may cross or be perpendicular to the first tubular member 1, and the axis of the pipe 30 may not be in the same plane as the axis of the first tubular member 1. The first tubular member 1 may be a manifold, a distribution manifold, a collection manifold or a storage tank, etc. The first tubular member 1 may also be a pipeline or a container with a curved side.

Figure 2:
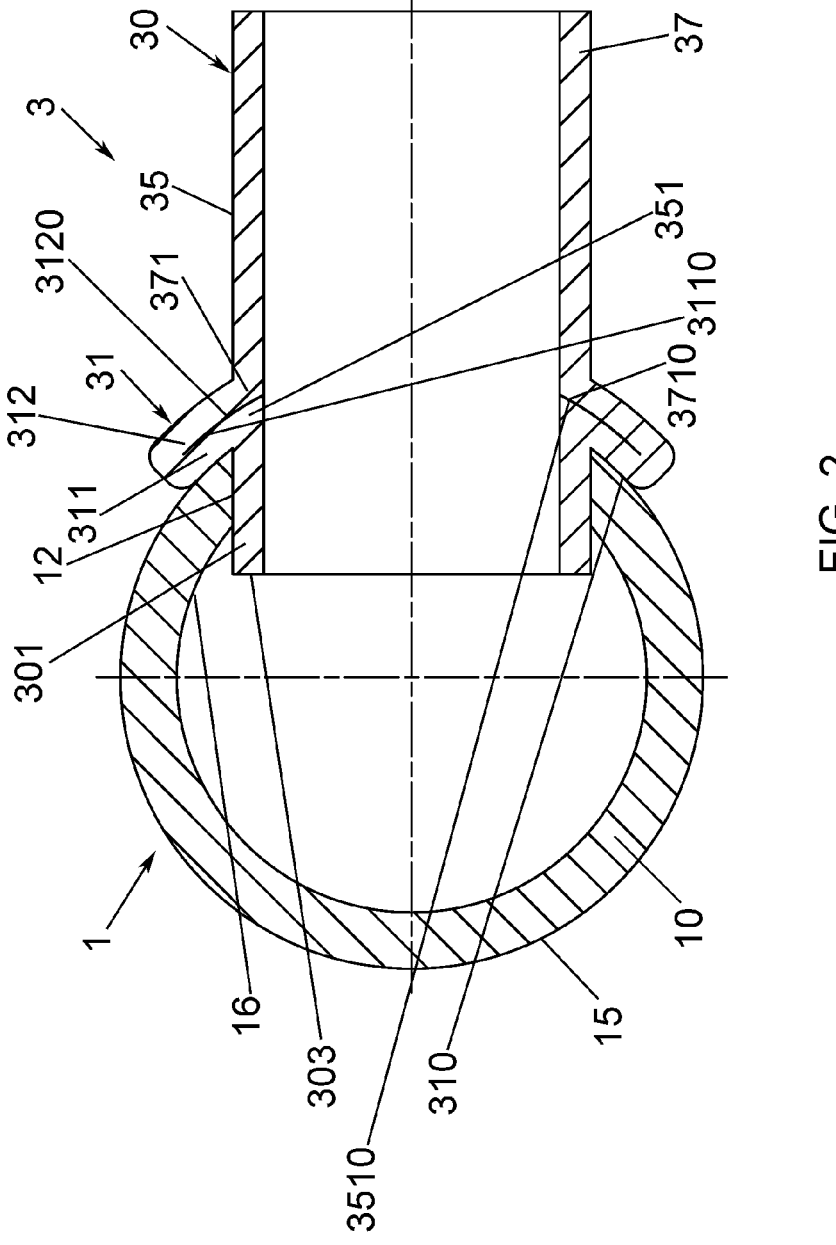
FIG. 2 is a schematic cross-sectional view of the connecting pipe assembly connected to the first tubular member shown in FIG. 1.
Figure 8:
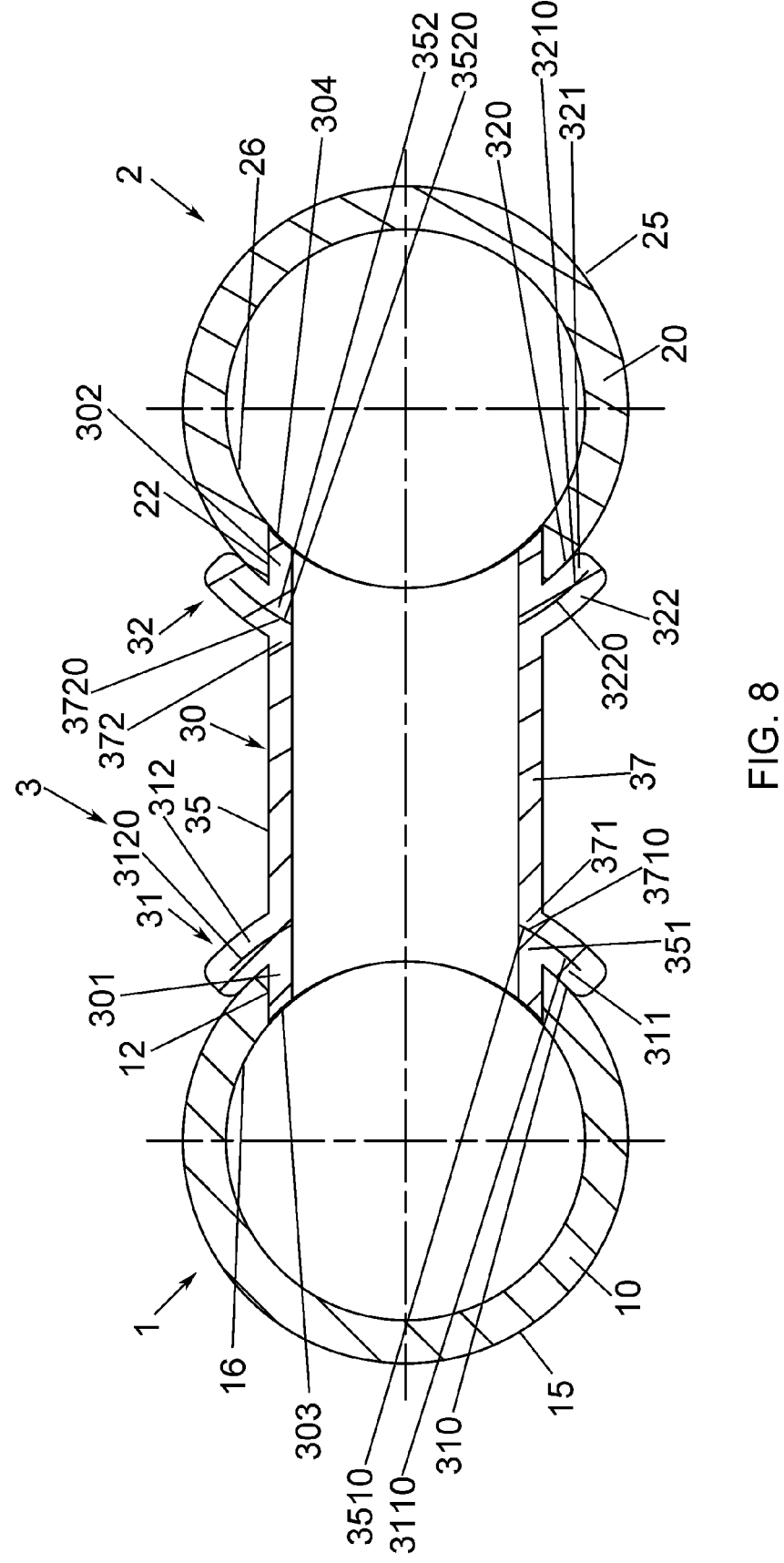
FIG. 8 is a schematic cross-sectional view of the connecting pipe assembly connected to the first tubular member and the second tubular member shown in FIG. 7.

Referring to FIG. 2 and FIG. 8, in embodiments of the present disclosure, the pipe 30 has a uniform inner diameter throughout a whole length of the pipe 30.

Figure 3:
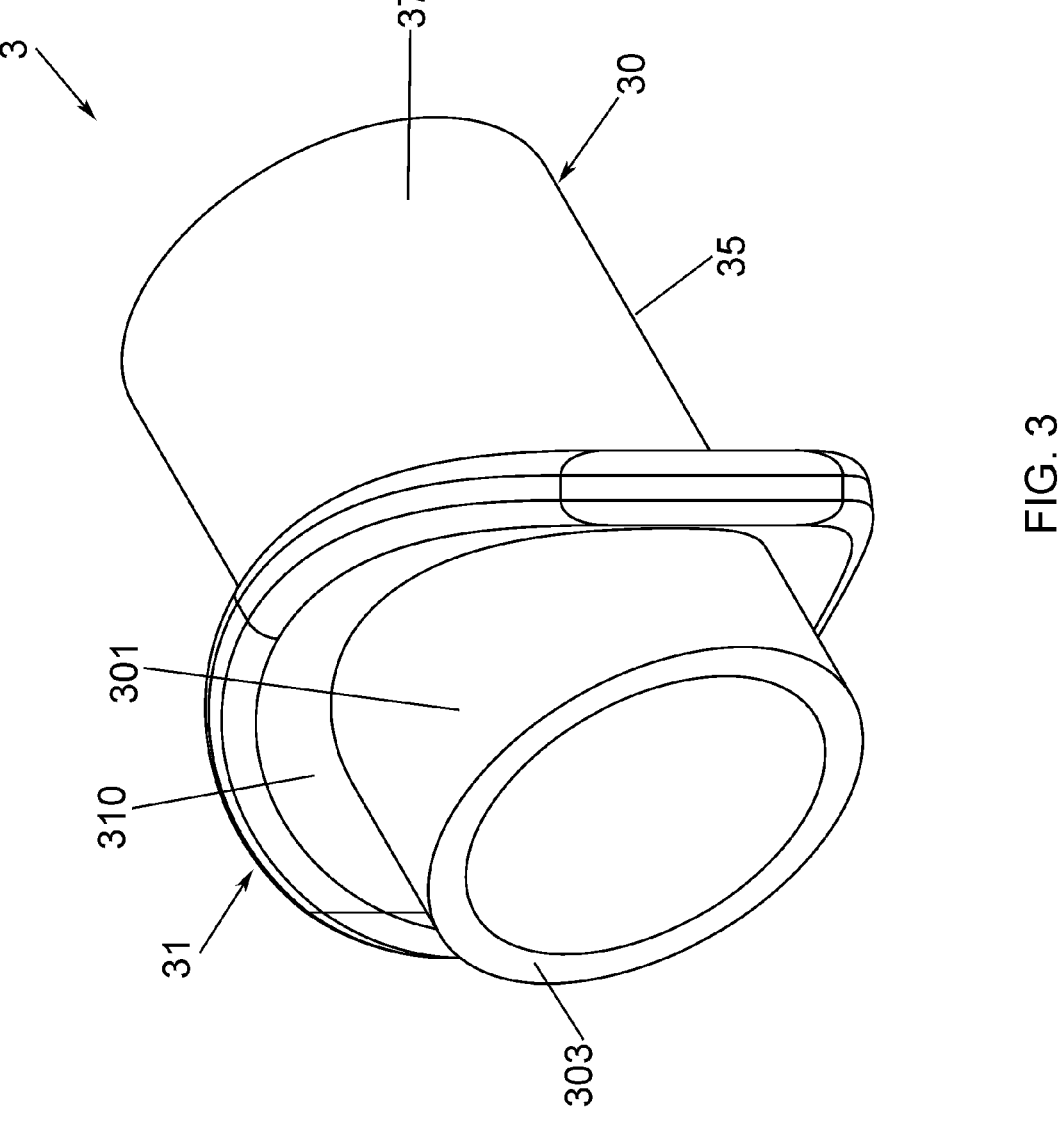
FIG. 3 is a schematic perspective view of the connecting pipe assembly shown in FIG. 1.
Figure 4:
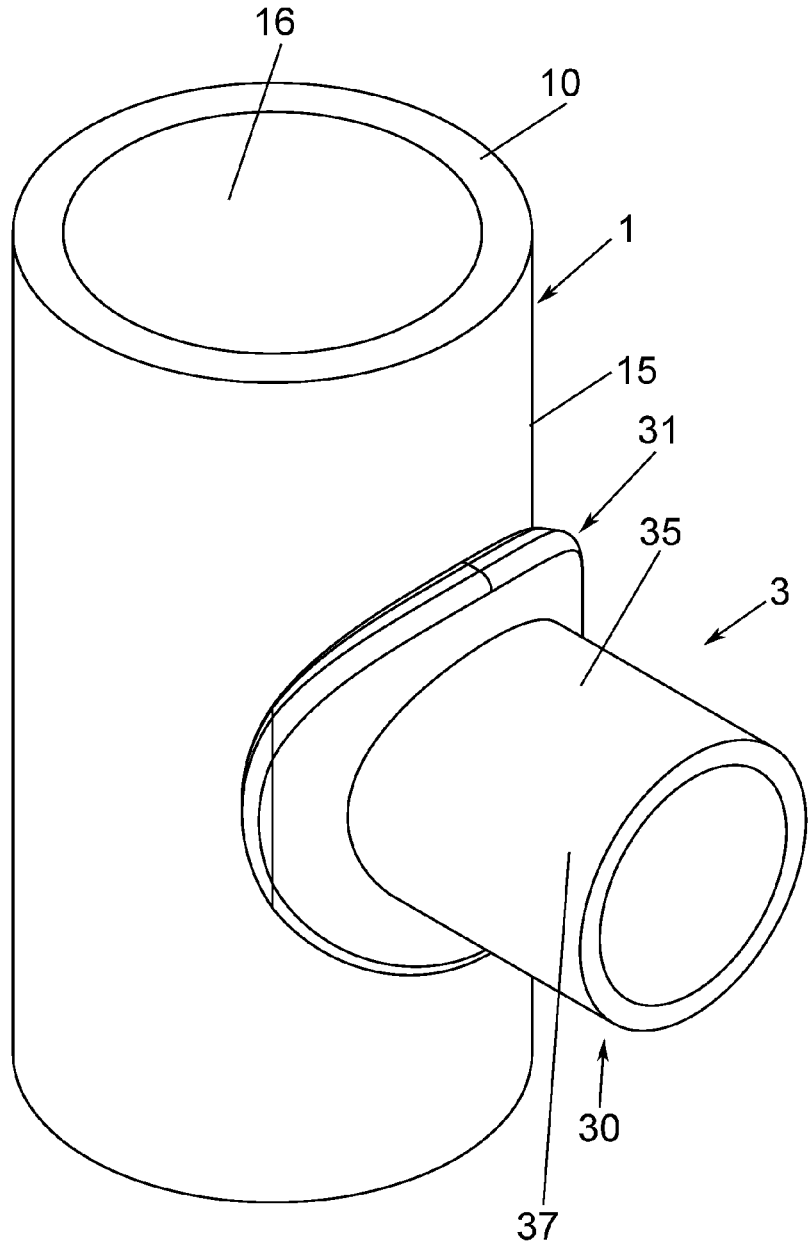
FIG. 4 is a schematic perspective view of a connecting pipe assembly connected to a first tubular member according to a modification of the embodiment of the present disclosure.

In the embodiment shown in FIG. 1 to FIG. 3, referring to FIG. 2, the first insertion pipe section 301 is configured such that a first end face 303 of the first insertion pipe section 301 exceeds a first inner peripheral surface 16 of the first tube wall 10 of the first tubular member 1. Specifically, at least a portion of the first end face 303 of the first insertion pipe section 301 exceeds a corresponding portion of the first inner peripheral surface 16 of the first tube wall 10 of the first tubular member 1 surrounding the first opening 12, in a radial direction of the first tubular member 1, and at least the portion of the first end face 303 of the first insertion pipe section 301 may have a concave shape corresponding to the corresponding portion of the first inner peripheral surface 16 of the first tube wall 10 of the first tubular member 1, as viewed in the axial direction of the first tubular member 1. Namely, the first end face 303 of the first insertion pipe section 301 exceeds the first inner peripheral surface 16 of the first tube wall 10 of the first tubular member 1. In the embodiments shown in FIG. 4 to FIG. 8, referring to FIG. 5 and FIG. 8, the first insertion pipe section 301 is configured such that the first end face 303 of the first insertion pipe section 301 is aligned with the corresponding portion of the first inner peripheral surface 16 of the first tube wall 10 of the first tubular member 1 surrounding the first opening 12, in the axial direction of the first tubular member 1. Therefore, the first insertion pipe section 301 has an arc shape matching the inner wall of the first tubular member 1, so as to increase the flow area of the fluid in the first tubular member 1, thereby reducing flow resistance. As an alternative embodiment, the first insertion pipe section 301 is configured such that, in the radial direction of the first tubular member 1 or in a wall thickness direction of the first tube wall 10 of the first tubular member 1, the first end face 303 of the first insertion pipe section 301 is between the portion of the first outer peripheral surface 15 of the first tube wall 10 of the first tubular member 1 surrounding the first opening 12 and the portion of the first inner peripheral surface 16 of the first tube wall 10 of the first tubular member 1 surrounding the first opening 12. Namely, the first end face 303 of the first insertion pipe section 301 does not exceed the first inner peripheral surface 16 of the first tube wall 10 of the first tubular member 1.

Figure 5:
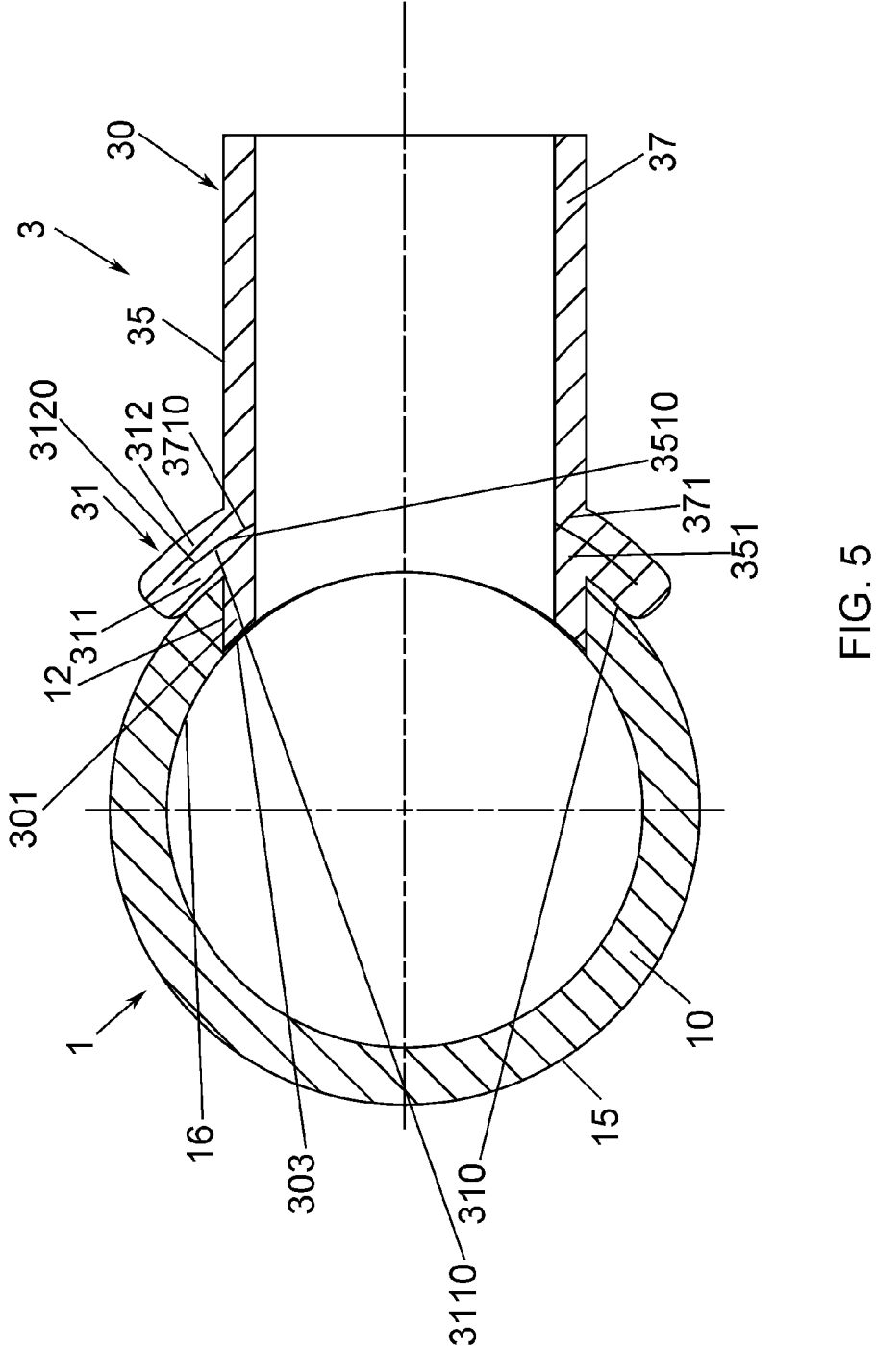
FIG. 5 is a schematic cross-sectional view of the connecting pipe assembly connected to the first tubular member shown in FIG. 4.
Figure 6:
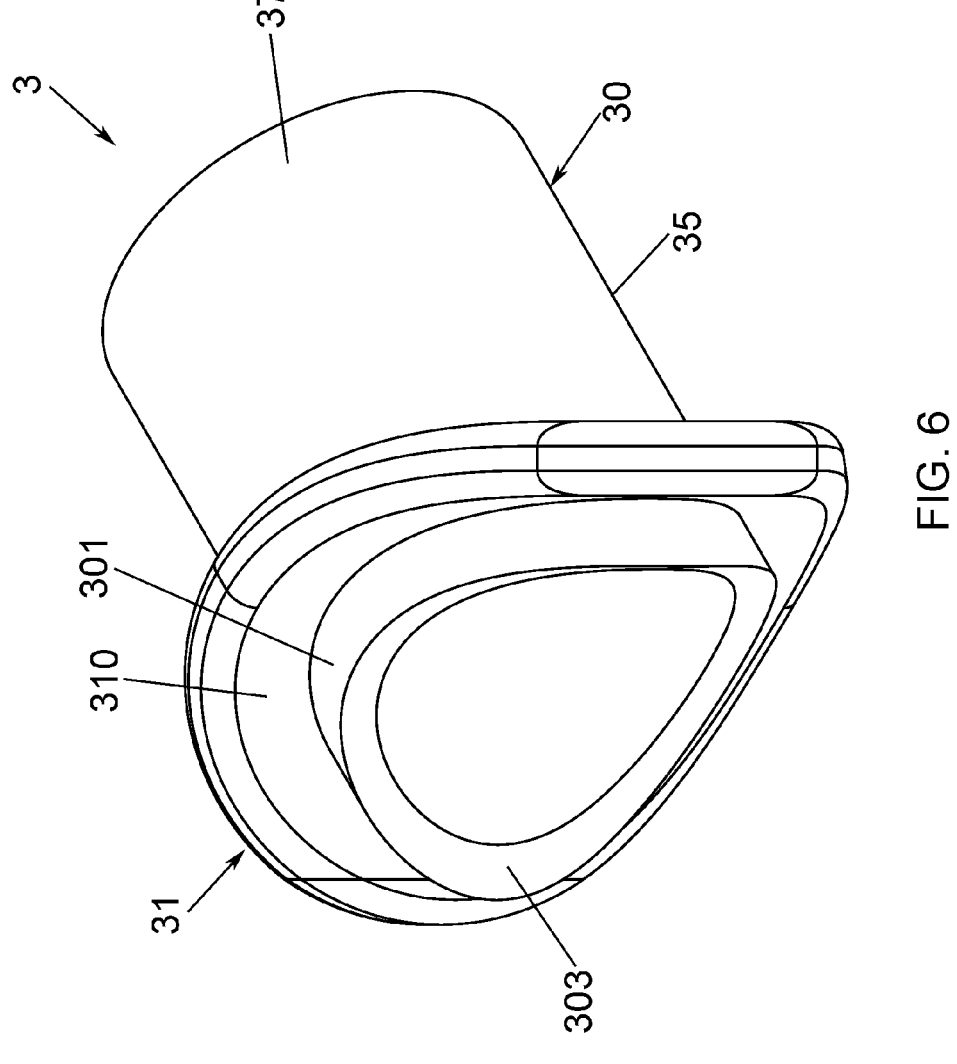
FIG. 6 is a schematic perspective view of the connecting pipe assembly shown in FIG. 4.

Referring to FIG. 2, FIG. 5 and FIG. 8, in embodiments of the present disclosure, the first flange 31 includes a first flange portion 311 extending towards a radial outside from an end 351 of the first insertion pipe section 301 of the pipe 30 and a second flange portion 312 extending towards a radial outside from an end 371 of the connecting pipe section 37 of the pipe 30, an end face 3510 of the end 351 of the first insertion pipe section 301 of the pipe 30 and an end face 3710 of the end 371 of the connecting pipe section 37 of the pipe 30 abut against each other in the axial direction of the pipe 30, surfaces 3110, 3120, facing each other, of the first flange portion 311 and the second flange portion 312 of the first flange 31 abut against each other in the axial direction of the pipe 30, and the first insertion pipe section 301 and the connecting pipe section 37 of the pipe 30 and the first flange portion 311 and the second flange portion 312 of the first flange 31 are formed of a single pipe. For example, the connecting pipe assembly 3 is formed by extruding the single pipe so that a portion of a pipe wall of the single pipe in an axial direction overlaps to form the first flange 31.

Figure 7:
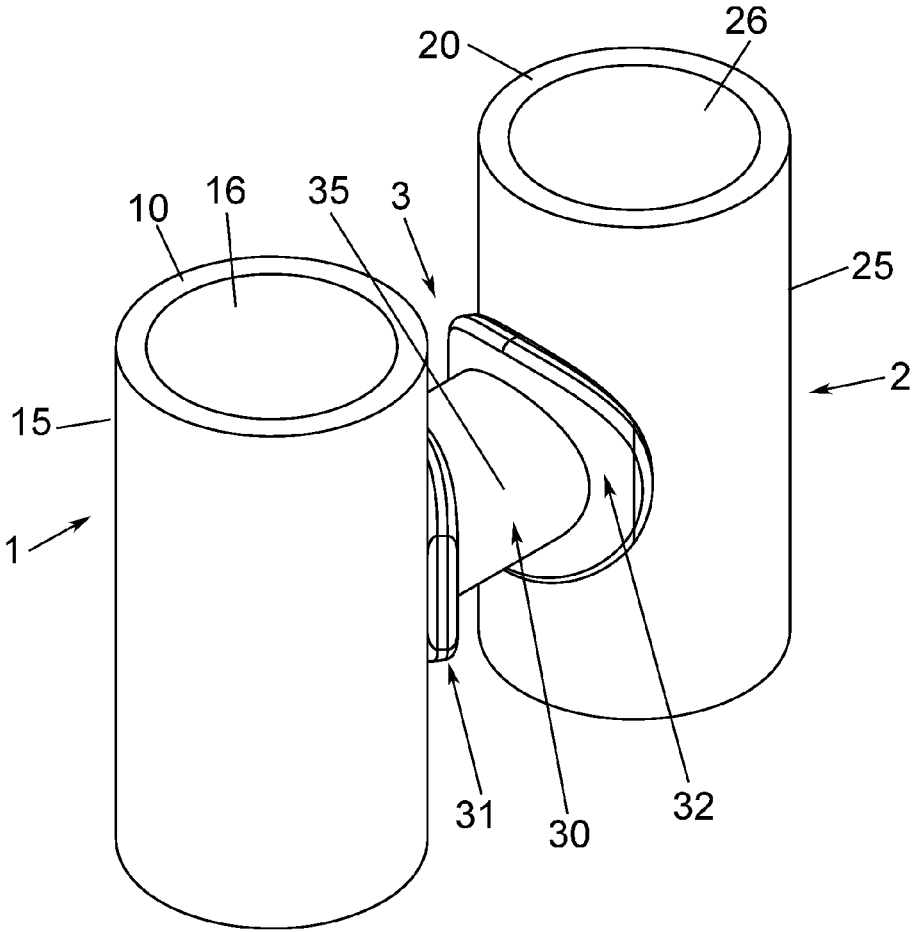
FIG. 7 is a schematic perspective view of a connecting pipe assembly connected to a first tubular member and a second tubular member according to an embodiment of the present disclosure.

Referring to FIG. 7 and FIG. 8, in embodiments of the present disclosure, the connecting pipe assembly 3 further includes: a second flange 32 extending towards the radial outside from the outer peripheral surface 35 of the pipe 30 on the other side of the first flange 31 in the axial direction of the pipe 30. The pipe further includes a second insertion pipe section 302 located on one side of the second flange 32 away from the first flange 31 in the axial direction of the pipe 30. According to examples of the present disclosure, the second insertion pipe section 302 is configured to be inserted in a second opening 22 formed in a second tube wall 20 of a second tubular member 2 which is to be connected with the connecting pipe assembly 3, and the second flange 32 is configured such that a second surface 320 of the second flange 32 on the one side of the second flange 32 is connected with a second outer peripheral surface 25 of the second tube wall 20 of the second tubular member 2, so that the first tubular member 1 and the second tubular member 2 are in fluid communication with each other through the pipe 30. An outer peripheral surface of the second insertion pipe section 302 and an inner peripheral surface of the second opening 22 may have the same shape. The second flange 32 may be further configured such that the second surface 320 of the second flange 32 has a same shape as a corresponding portion of the second outer peripheral surface 25 of the second tube wall 20 of the second tubular member 2 surrounding the second opening 22. For example, the second outer peripheral surface 25 of the second tube wall 20 of the second tubular member 2 is a cylindrical surface, and the second surface 320 of the second flange 32 has a shape of a part of a cylindrical surface. An angle between an axis of the pipe 30 and an axis of the second tubular member 2 may be in the range of 85° to 90°. The pipe 30 may cross or be perpendicular to the second tubular member 2, and the axis of the pipe 30 may not be in the same plane as the axis of the second tubular member 2. The second tubular member 2 may be a manifold, a distribution manifold, a collection manifold or a storage tank, etc. The second tubular member 2 may also be a pipeline or a container with a curved side.

Referring to FIG. 8, in embodiments of the present disclosure, the second insertion pipe section 302 is configured such that a second end face 304 of the second insertion pipe section 302 is aligned with a corresponding portion of a second inner peripheral surface 26 of the second tube wall 20 of the second tubular member 2 surrounding the second opening 22, in the axial direction of the second tubular member 2. Therefore, the second insertion pipe section 302 has an arc shape matching the inner wall of the second tubular member 2, so as to increase the flow area of the fluid in the second tubular member 2, thereby reducing flow resistance. As an alternative embodiment, the second insertion pipe section 302 is configured such that the second end face 304 of the second insertion pipe section 302 exceeds the second inner peripheral surface 26 of the second tube wall 20 of the second tubular member 2. Specifically, at least a portion of the second end face 304 of the second insertion pipe section 302 exceeds the corresponding portion of the second inner peripheral surface 26 of the second tube wall 20 of the second tubular member 2 surrounding the second opening 22, in a radial direction of the second tubular member 2, and at least the portion of the second end face 304 of the second insertion pipe section 302 may have a concave shape corresponding to the corresponding portion of the second inner peripheral surface 26 of the second tube wall 20 of the second tubular member 2, as viewed in the axial direction of the second tubular member 2. Namely, the second end face 304 of the second insertion pipe section 302 exceeds the second inner peripheral surface 26 of the second tube wall 20 of the second tubular member 2. As another alternative embodiment, the second insertion pipe section 302 is configured such that, in the radial direction of the second tubular member 2 or in a wall thickness direction of the second tube wall 20 of the second tubular member 2, the second end face 304 of the second insertion pipe section 302 is between the portion of the second outer peripheral surface 25 of the second tube wall 20 of the second tubular member 2 surrounding the second opening 22 and the portion of the second inner peripheral surface 26 of the second tube wall 20 of the second tubular member 2 surrounding the second opening 22. Namely, the second end face 304 of the second insertion pipe section 302 does not exceed the second inner peripheral surface 26 of the second tube wall 20 of the second tubular member 2.

Referring to FIG. 8, in embodiments of the present disclosure, the pipe 30 further includes a connecting pipe section 37 located between the first flange 31 and the second flange 32. The first flange 31 includes a first flange portion 311 extending towards a radial outside from an end 351 of the first insertion pipe section 301 of the pipe 30 and a second flange portion 312 extending towards a radial outside from a first end 371 of the connecting pipe section 37 of the pipe 30, an end face 3510 of the end 351 of the first insertion pipe section 301 of the pipe 30 and an end face 3710 of the first end 371 of the connecting pipe section 37 of the pipe 30 abut against each other in the axial direction of the pipe 30, and surfaces 3110, 3120, facing each other, of the first flange portion 311 and the second flange portion 312 of the first flange 31 abut against each other in the axial direction of the pipe 30. The second flange 32 includes a first flange portion 321 extending towards a radial outside from an end 352 of the second insertion pipe section 302 of the pipe 30 and a second flange portion 322 extending towards a radial outside from a second end 372 of the connecting pipe section 37 of the pipe 30, an end face 3520 of the end 352 of the second insertion pipe section 302 of the pipe 30 and an end face 3720 of the second end 372 of the connecting pipe section 37 of the pipe 30 abut against each other in the axial direction of the pipe 30, and surfaces 3210, 3220, facing each other, of the first flange portion 321 and the second flange portion 322 of the second flange 32 abut against each other in the axial direction of the pipe 30. The first insertion pipe section 301, the connecting pipe section 37 and the second insertion pipe section 302 of the pipe 30, the first flange portion 311 and the second flange portion 312 of the first flange 31, and the first flange portion 321 and the second flange portion 322 of the second flange 32 are formed of a single pipe. For example, the connecting pipe assembly 3 is formed by extruding the single pipe so that a portion of a pipe wall of the single pipe in an axial direction overlaps to form the first flange 31 and another portion of the pipe wall of the single pipe in the axial direction overlaps to form the second flange 32.

Figure 9:
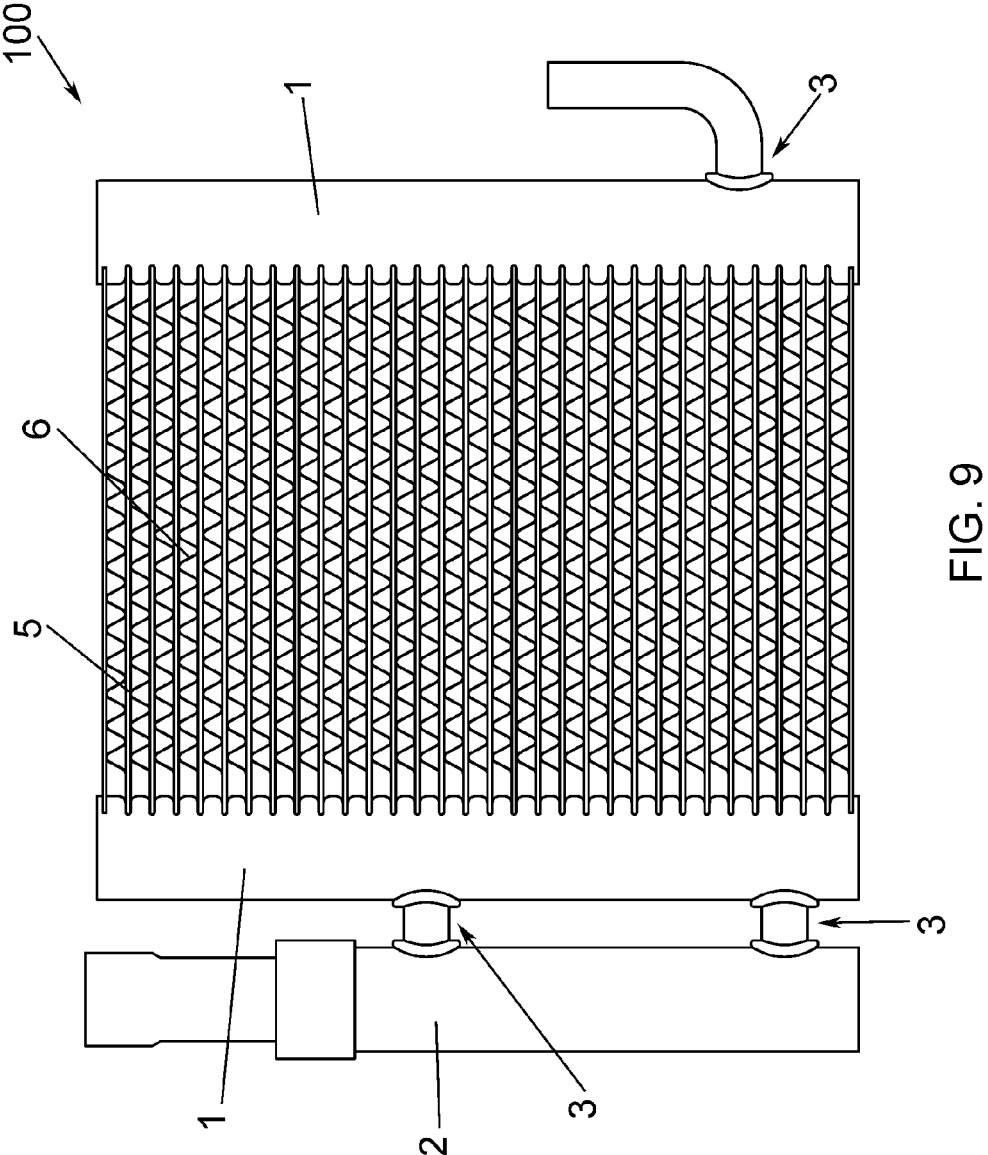
FIG. 9 is a schematic front view of a heat exchanger according to an embodiment of the present disclosure.
Figure 10:
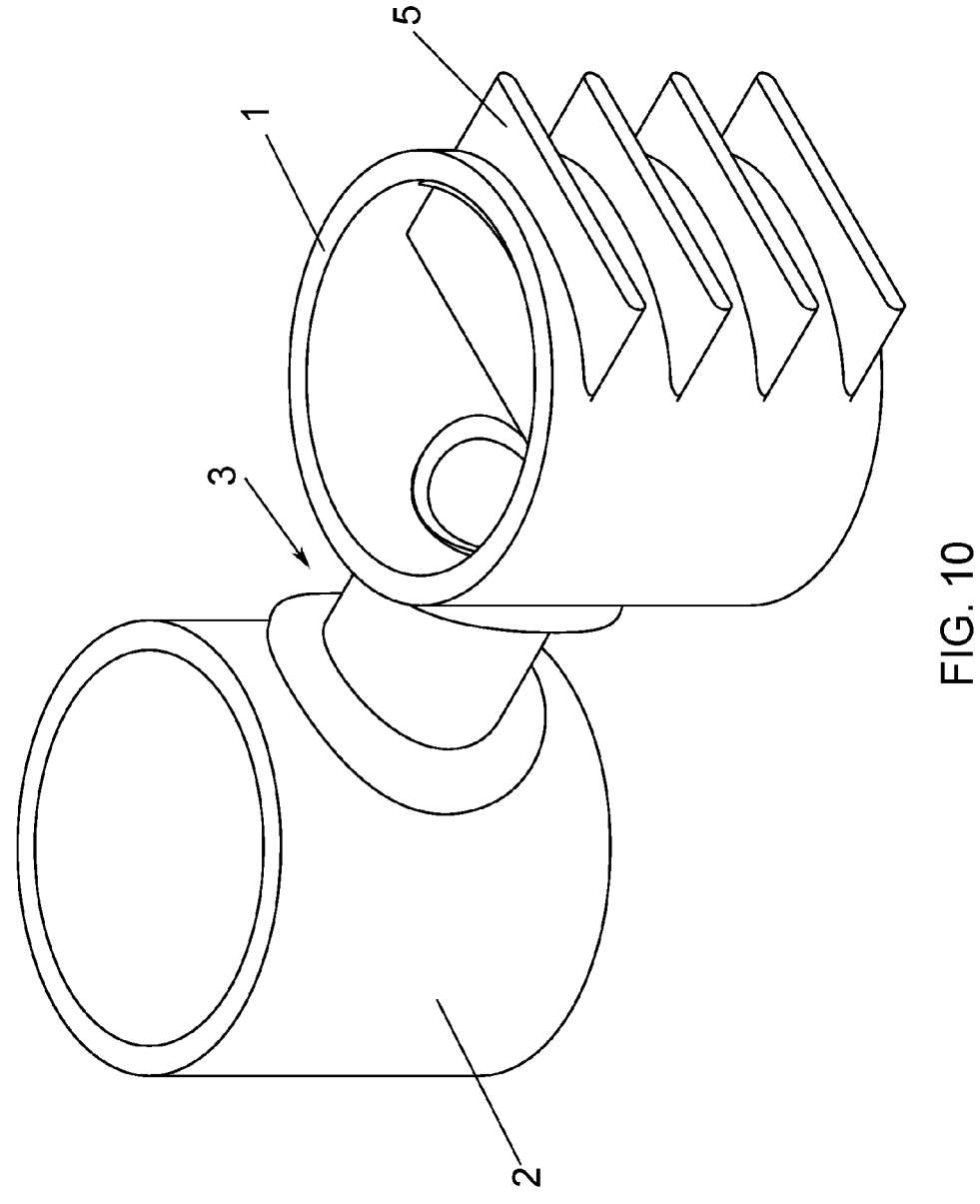
FIG. 10 is a schematic partial enlarged perspective view of a portion of the heat exchanger shown in FIG. 9 including a connecting pipe assembly.
Figure 11:
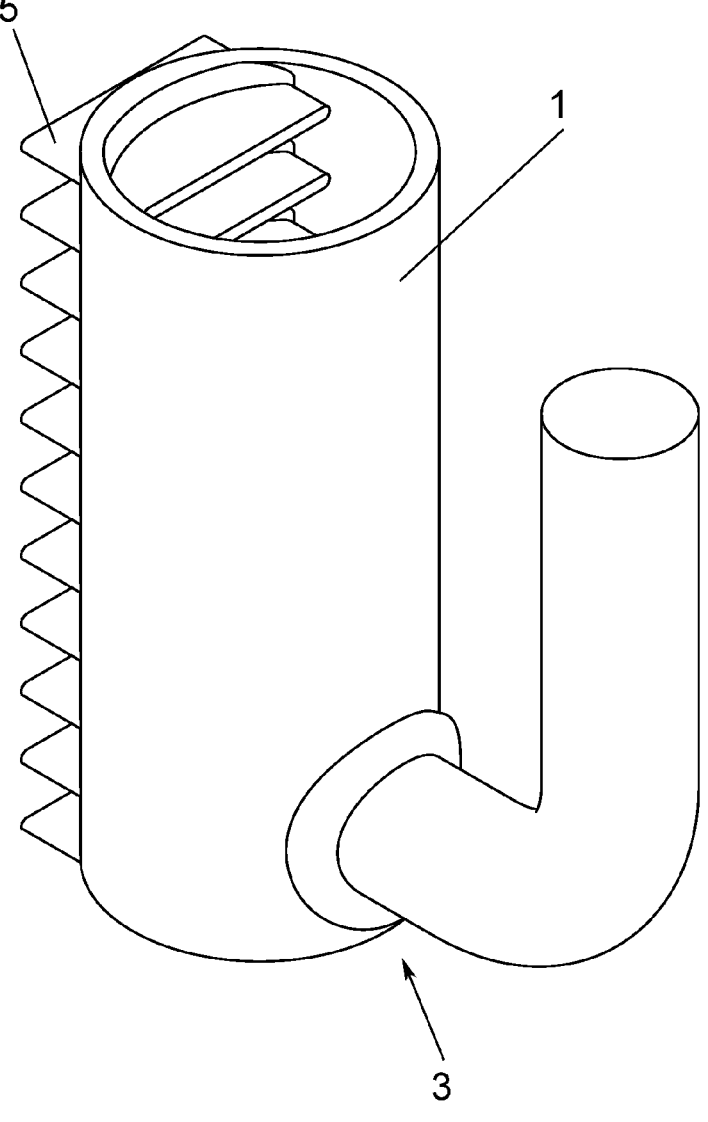
FIG. 11 is a schematic partial enlarged perspective view of a portion of the heat exchanger shown in FIG. 9 including another connecting pipe assembly.

Referring to FIG. 9 to FIG. 11, a heat exchanger 100 according to embodiments of the present disclosure includes: a first tubular member 1 (which is a manifold in the embodiments shown in FIG. 9 to FIG. 11,) extending in a first direction, and a connecting pipe assembly 3. Referring to FIG. 1 to FIG. 8, in embodiments of the present disclosure, the first tubular member 1 has a first opening 12 passing through a first tube wall 10 of the first tubular member 1. The connecting pipe assembly 3 includes: a pipe 30; and a first flange 31 extending towards a radial outside from an outer peripheral surface 35 of the pipe 30. The pipe 30 includes a first insertion pipe section 301 on one side of the first flange 31 in an axial direction of the pipe 30. The first insertion pipe section 301 is inserted in the first opening 12 formed in the first tube wall 10 of the first tubular member 1, and a first surface 310 of the first flange 31 facing the first tubular member 1 is connected with a first outer peripheral surface 15 of the first tube wall 10 of the first tubular member 1. An outer peripheral surface of the first insertion pipe section 301 may have a same shape as an inner peripheral surface of the first opening 12. The first surface 310 of the first flange 31 may have a same shape as a corresponding portion of the first outer peripheral surface 15 of the first tube wall 10 of the first tubular member 1 surrounding the first opening 12. For example, the first outer peripheral surface 15 of the first tube wall 10 of the first tubular member 1 is a cylindrical surface, and the first surface 310 of the first flange 31 has a shape of a part of a cylindrical surface. An angle between an axis of the pipe 30 of the connecting pipe assembly 3 and an axis of the first tubular member 1 is in the range of 85° to 90°. The pipe 30 of the connecting pipe assembly 3 may cross or be perpendicular to the first tubular member 1, and the axis of the pipe 30 of the connecting pipe assembly 3 may not be in the same plane as the axis of the first tubular member 1. The pipe 30 of the connecting pipe assembly 3 may has a uniform inner diameter throughout a whole length of the pipe 30.

In the embodiment shown in FIG. 1 to FIG. 3, referring to FIG. 2, a first end face 303 of the first insertion pipe section 301 exceeds a first inner peripheral surface 16 of the first tube wall 10 of the first tubular member 1. In the embodiments shown in FIG. 4 to FIG. 8, referring to FIG. 5 and FIG. 8, the first end face 303 of the first insertion pipe section 301 is aligned with a corresponding portion of the first inner peripheral surface 16 of the first tube wall 10 of the first tubular member 1 surrounding the first opening 12, in an axial direction of the first tubular member 1. Therefore, the first insertion pipe section 301 has an arc shape matching the inner wall of the first tubular member 1, so as to increase the flow area of the fluid in the first tubular member 1, thereby reducing flow resistance. As an alternative embodiment, in a radial direction of the first tubular member 1 or in a wall thickness direction of the first tube wall 10 of the first tubular member 1, the first end face 303 of the first insertion pipe section 301 is between the portion of the first outer peripheral surface 15 of the first tube wall 10 of the first tubular member 1 surrounding the first opening 12 and the corresponding portion of the first inner peripheral surface 16 of the first tube wall 10 of the first tubular member 1 surrounding the first opening 12. Namely, the first end face 303 of the first insertion pipe section 301 does not exceed the first inner peripheral surface 16 of the first tube wall 10 of the first tubular member 1.

Referring to FIG. 9 to FIG. 11, the heat exchanger according to the embodiments of the present disclosure further includes: a second tubular member 2 (which is a collection manifold or storage tank, etc. in the embodiment shown in FIG. 9 and FIG. 10) disposed side by side with the first tubular member 1. Referring to FIG. 7 and FIG. 8, in embodiments of the present disclosure, the second tubular member 2 has a second opening 22 passing through a second tubular wall 20 of the second tubular member 2. The connecting pipe assembly 3 further includes: a second flange 32 extending towards the radial outside from the outer peripheral surface 35 of the pipe 30 on the other side of the first flange 31 in the axial direction of the pipe 30. The pipe 30 further includes a second insertion pipe section 302 on one side of the second flange 32 away from the first flange 31 in the axial direction of the pipe 30, the second insertion pipe section 302 is inserted in the second opening 22 in the second tube wall 20 of the second tubular member 2, and a second surface 320 of the second flange 32 facing the second tubular member 2 is connected with a second outer peripheral surface 25 of the second tube wall 20 of the second tubular member 2, so that the first tubular member 1 is in fluid communication with the second tubular member 2 through the pipe of the connecting pipe assembly 3. An outer peripheral surface of the second insertion pipe section 302 and an inner peripheral surface of the second opening 22 may have the same shape. According to embodiments of the present disclosure, the first surface 310 of the first flange 31 may have a same shape as a corresponding portion of the first outer peripheral surface 15 of the first tube wall 10 of the first tubular member 1 surrounding the first opening 12, and the second surface 320 of the second flange 32 may have a same shape as a corresponding portion of the second outer peripheral surface 25 of the second tube wall 20 of the second tubular member 2 surrounding the second opening 22. For example, the first outer peripheral surface 15 of the first tube wall 10 of the first tubular member 1 is a cylindrical surface, and the first surface 310 of the first flange 31 has a shape of a part of a cylindrical surface, and the second outer peripheral surface 25 of the second tube wall 20 of the second tubular member 2 is a cylindrical surface, and the second surface 320 of the second flange 32 has a shape of a part of a cylindrical surface. An angle between an axis of the pipe 30 of the connecting pipe assembly 3 and an axis of the first tubular member 1 may be in the range of 85° to 90°, and an angle between the axis of the pipe 30 of the connecting pipe assembly 3 and an axis of the second tubular member 2 may be in the range of 85° to 90°.

Referring to FIG. 8, in embodiments of the present disclosure, the first end face 303 of the first insertion pipe section 301 is aligned with the corresponding portion of the first inner peripheral surface 16 of the first tube wall 10 of the first tubular member 1 surrounding the first opening 12, in the axial direction of the first tubular member 1. Therefore, the first insertion pipe section 301 has an arc shape matching the inner wall of the first tubular member 1, so as to increase the flow area of the fluid in the first tubular member 1, thereby reducing flow resistance. As an alternative embodiment, at least a portion of the first end face 303 of the first insertion pipe section 301 exceeds the corresponding portion of the first inner peripheral surface 16 of the first tube wall 10 of the first tubular member 1 surrounding the first opening 12, in the radial direction of the first tubular member 1, and at least the portion of the first end face 303 of the first insertion pipe section 301 may have a concave shape corresponding to the corresponding portion of the first inner peripheral surface 16 of the first tube wall 10 of the first tubular member 1, as viewed in the axial direction of the first tubular member 1. Namely, the first end face 303 of the first insertion pipe section 301 exceeds the first inner peripheral surface 16 of the first tube wall 10 of the first tubular member 1. As another alternative embodiment, the first end face 303 of the first insertion pipe section 301 exceeds the first inner peripheral surface 16 of the first tube wall 10 of the first tubular member 1, or in the radial direction of the first tubular member 1 or in the wall thickness direction of the first tube wall 10 of the first tubular member 1, the first end face 303 of the first insertion pipe section 301 is between the portion of the first outer peripheral surface 15 of the first tube wall 10 of the first tubular member 1 surrounding the first opening 12 and the portion of the first inner peripheral surface 16 of the first tube wall 10 of the first tubular member 1 surrounding the first opening 12. Namely, the first end face 303 of the first insertion pipe section 301 does not exceed the first inner peripheral surface 16 of the first tube wall 10 of the first tubular member 1. A second end face 304 of the second insertion pipe section 302 is aligned with a corresponding portion of a second inner peripheral surface 26 of the second tube wall 20 of the second tubular member 2 surrounding the second opening 22, in an axial direction of the second tubular member 2. Therefore, the second insertion pipe section 302 has an arc shape matching the inner wall of the second tubular member 2, so as to increase the flow area of the fluid in the second tubular member 1, thereby reducing flow resistance. As an alternative embodiment, the second end face 304 of the second insertion pipe section 302 exceeds the second inner peripheral surface 26 of the second tube wall 20 of the second tubular member 2, or in the radial direction of the second tubular member 2 or in the wall thickness direction of the second tube wall 20 of the second tubular member 2, the second end face 304 of the second insertion pipe section 302 is between the portion of the second outer peripheral surface 25 of the second tube wall 20 of the second tubular member 2 surrounding the second opening 22 and a corresponding portion of the second inner peripheral surface 26 of the second tube wall 20 of the second tubular member 2 surrounding the second opening 22. Namely, the second end face 304 of the second insertion pipe section 302 does not exceed the second inner peripheral surface 26 of the second tube wall 20 of the second tubular member 2. As another alternative embodiment, at least a portion of the second end face 304 of the second insertion pipe section 302 exceeds the corresponding portion of the second inner peripheral surface 26 of the second tube wall 20 of the second tubular member 2 surrounding the second opening 22, in the radial direction of the second tubular member 2, and at least the portion of the second end face 304 of the second insertion pipe section 302 may have a concave shape corresponding to the corresponding portion of the second inner peripheral surface 26 of the second tube wall 20 of the second tubular member 2, as viewed in the axial direction of the second tubular member 2. Namely, the second end face 304 of the second insertion pipe section 302 exceeds the second inner peripheral surface 26 of the second tube wall 20 of the second tubular member 2.

Referring to FIG. 9, the heat exchanger 100 according to the embodiments of the present disclosure further includes: a plurality of heat exchange tubes 5 connected and fluidly communicated with the manifold serving as the first tubular member 1, and a plurality of fins 6 arranged alternately with the plurality of heat exchange tubes 5.

According to the practical application, the inventors of the present disclosure found that in order to ensure the soldering strength of the flange (the first flange and the second flange) of the connecting pipe assembly and the pipe wall of the tubular member (the first tubular member and the second tubular member) and to ensure that the flange of the connecting pipe assembly and the pipe wall of the tubular member are stable without deformation, assuming that the flange of the connecting pipe assembly has a substantially circular ring shape as viewed in the axial direction of the pipe of the connecting pipe assembly, a width $L_f$ of an annular overlapping band (a soldering band) between the flange of the connecting pipe assembly and the pipe wall of the tubular member satisfies the following relation:

$$1.7 * \frac{R_P^2}{R_M^2} * t \leq L_f \leq 10.3 * \frac{R_P^2}{R_M^2} * t$$

where:

$R_p$ is a radius of the outer peripheral surface of the pipe of the connecting pipe assembly;

$R_M$ is a radius of the outer peripheral surface of the tube wall of the tubular member; and $t$ is a wall thickness of the pipe of the connecting pipe assembly.

With the heat exchanger 100 according to the embodiments of the present disclosure, the quality of the heat exchanger 100 can be improved. In addition, with the connecting pipe assembly according to the present disclosure, the soldering strength between the connecting pipe assembly and the heat exchanger is increased, and the positioning function of the connecting pipe assembly is additionally provided so that the soldering in the soldering furnace is achieved, thereby saving the cost. In addition, the connecting pipe assembly is simple in the processing since it can be formed by extruding a pipe, thereby further saving the cost.

In addition, the connecting pipe assembly according to the present disclosure includes the insertion pipe section and the flange. When the connecting pipe assembly is soldered with the manifold, the insertion pipe section extends into the pipe wall or the cavity of the manifold, and the flange and the manifold can fit together, so that the insertion pipe section and the flange provide a positioning function when used in conjunction with the manifold.

With the connecting pipe assembly according to the present disclosure, since the connecting pipe assembly and the manifold have a larger fitting surface, the soldering strength between the connecting pipe assembly and the manifold is increased. In addition, the positioning function of the connecting pipe assembly is additionally provided. When assembling, the positioning is achieved simply by inserting the insertion pipe section into the pipe wall or the cavity of the manifold, and fitting the fitting surface of the flange to the outer surface of the manifold. With the connecting pipe assembly according to the present disclosure, the soldering in the soldering furnace can be achieved so that the cost is saved, since the connecting pipe assembly can be soldered with the manifold in the soldering furnace. In addition, the connecting pipe assembly is simple in the processing since it can be formed by extruding a pipe, thereby saving the cost. The connecting pipe assembly can be formed by integrally extruding a single pipe, so that the processing procedure is simple.

Although the above embodiments have been described, some features of the above embodiments can be combined to form new embodiments.

What is claimed is:

1. A heat exchanger, comprising:

a first tubular member extending in a first direction, wherein the first tubular member has a first opening passing through a first tube wall of the first tubular member;

a second tubular member disposed side by side with the first tubular member, wherein the second tubular member has a second opening passing through a second tubular wall of the second tubular member, and a connecting pipe assembly comprising: a pipe; a first flange and a second flange, each flange extending towards a radial outside from an outer peripheral surface of the pipe, wherein:

the pipe comprises a first insertion pipe section on one side of the first flange in an axial direction of the pipe and a second insertion pipe section on one side of the second flange in the axial direction of the pipe, the first insertion pipe section is inserted in the first opening formed in the first tube wall of the first tubular member, and a first surface of the first flange facing the first tubular member is connected with a first outer peripheral surface of the first tube wall of the first tubular member, the second insertion pipe section is inserted in the second opening formed in the second tube wall of the second tubular member, and a second surface of the second flange facing the second tubular member is connected with a second outer peripheral surface of the second tube wall of the second tubular member, so that the first tubular member is in fluid communication with the second tubular member through the pipe of the connecting pipe assembly, at least a portion of a first end face of the first insertion pipe section exceeds the corresponding portion of the first inner peripheral surface of the first tube wall of the first tubular member surrounding the first opening, in a radial direction of the first tubular member, and at least a portion of a second end face of the second insertion pipe section exceeds the corresponding portion of the second inner peripheral surface of the second tube wall of the second tubular member surrounding the second opening, in a radial direction of the second tubular member.

2. The heat exchanger according to claim 1, wherein:

the first surface of the first flange has a same shape as a corresponding portion of the first outer peripheral surface of the first tube wall of the first tubular member surrounding the first opening.

3. The heat exchanger according to claim 1, wherein:

at least the portion of the first end face of the first insertion pipe section has a concave shape corresponding to the corresponding portion of the first inner peripheral surface of the first tube wall of the first tubular member, as viewed in the axial direction of the first tubular member.

4. The heat exchanger according to claim 1, wherein:

the first surface of the first flange has a same shape as a corresponding portion of the first outer peripheral surface of the first tube wall of the first tubular member surrounding the first opening; and/or the second surface of the second flange has a same shape as a corresponding portion of the second outer peripheral surface of the second tube wall of the second tubular member surrounding the second opening.

5. The heat exchanger according to claim 1, wherein:

at least the portion of the second end face of the second insertion pipe section has a concave shape corresponding to the corresponding portion of the second inner peripheral surface of the second tube wall of the second tubular member, as viewed in the axial direction of the second tubular member.

6. The heat exchanger according to claim 1, wherein:

the first tubular member is a manifold, and the heat exchanger further comprises: a plurality of heat exchange tubes connected and fluidly communicated with the manifold, and a plurality of fins arranged alternately with the plurality of heat exchange tubes.

7. The heat exchanger according to claim 2, wherein:

the first outer peripheral surface of the first tube wall of the first tubular member is a cylindrical surface, and the first surface of the first flange has a shape of a part of a cylindrical surface.

8. The heat exchanger according to claim 7, wherein:

the first flange of the connecting pipe assembly has a circular ring shape as viewed in the axial direction of the pipe of the connecting pipe assembly, a width $L_f$ of an annular overlapping band between the first flange of the connecting pipe assembly and the first pipe wall of the first tubular member satisfies the following relation:

$$1.7 * \frac{R_P^2}{R_M^2} * t \le L_f \le 10.3 * \frac{R_P^2}{R_M^2} * t$$

where:

$R_p$ is a radius of the outer peripheral surface of the pipe of the connecting pipe assembly;

$R_M$ is a radius of the first outer peripheral surface of the first tube wall of the first tubular member; and t is a wall thickness of the pipe of the connecting pipe assembly.

* * * * *